(12) United States Patent
Philip (10) Patent No.: US 8,779,352 B2
(45) Date of Patent: Jul. 15, 2014

(54) SCINTILLATOR BODY WITH SPIRAL SURFACE SCRATCHES

(71) Applicant: Olivier Philip, Ewing, NJ (US)

(72) Inventor: Olivier Philip, Ewing, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/630,504

(22) Filed: Sep. 28, 2012

(65) Prior Publication Data

US 2014/0091214 A1 Apr. 3, 2014

(51) Int. Cl.
*G01T 1/20* (2006.01)

(52) U.S. Cl.
CPC .................... *G01T 1/20* (2013.01)
USPC ........................................ 250/269.1

(58) Field of Classification Search
USPC ........................... 250/269.1, 487.1
See application file for complete search history.

(56) References Cited

U.S. PATENT DOCUMENTS

| 3,102,955 | A | * | 9/1963 | Carlson ................... 250/368 |
| 5,880,475 | A | | 3/1999 | Oka et al. |
| 6,563,120 | B1 | | 5/2003 | Baldwin et al. |
| 2007/0145260 | A1 | * | 6/2007 | Frederick et al. ........ 250/269.3 |
| 2010/0163735 | A1 | | 7/2010 | Menge et al. |
| 2012/0068075 | A1 | * | 3/2012 | Beddar et al. ............ 250/362 |

FOREIGN PATENT DOCUMENTS

| RU | 2300782 C2 | 6/2007 |
| SU | 1517572 A1 | 12/1990 |
| WO | 2010135298 A2 | 11/2010 |

OTHER PUBLICATIONS

International Search Report and Written Opinion issued in PCT/US2013/062296 on Jan. 30, 2014, 6 pages.

\* cited by examiner

*Primary Examiner* — David Porta
*Assistant Examiner* — Faye Boosalis
(74) *Attorney, Agent, or Firm* — Jeremy Berman (57) ABSTRACT

A radiation detector may include a housing and a scintillator body carried by the housing. The scintillator body may have an exterior surface with a plurality of surface scratches spiraling around the exterior surface. A photodetector may be coupled to the scintillator body.

21 Claims, 6 Drawing Sheets

SCINTILLATOR BODY WITH SPIRAL SURFACE SCRATCHES

BACKGROUND

Radiation detectors, such as gamma-ray detectors, for example, often use a scintillator material which converts energy deposited by a given type of radiation (e.g., gamma-rays) into light. The light is directed to a photodetector, which converts the light generated by the scintillator into an electrical signal, which may be used to measure the amount of radiation which is deposited in the crystal.

In the case of well-logging tools for hydrocarbon wells (e.g., gas and oil wells), a borehole gamma-ray detector may be incorporated into the tool string to measure radiation from the geological formation surrounding the borehole to determine information about the geological formation, including the location of gas and oil. Given the harsh operating conditions and space constraints associated with borehole operation, providing scintillator structures which are able to withstand relatively high stress levels and also provide desired operating characteristics may be difficult in some applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A radiation detector may include a housing and a scintillator body carried by the housing. The scintillator body may have an exterior surface with a plurality of surface scratches spiraling around the exterior surface. A photodetector may be coupled to the scintillator body.

A well-logging tool may include a sonde housing, a radiation generator carried by the sonde housing, and at least one radiation detector carried by the sonde housing. The at least one radiation detector may include a housing and a scintillator body carried by the housing. The scintillator body may have an exterior surface with a plurality of surface scratches spiraling around the exterior surface. The at least one radiation detector may further include a photodetector coupled to the scintillator body.

A scintillator may include a body having an exterior surface, and a plurality of spaced-apart ridges on the exterior surface defined by a plurality of surface scratches spiraling around the exterior surface.

A method for making a radiation detector may include positioning a scintillator body in a housing, where the scintillator body has an exterior surface with a plurality of surface scratches spiraling around the exterior surface of the scintillator body. The method may further include coupling a photodetector to the scintillator body.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
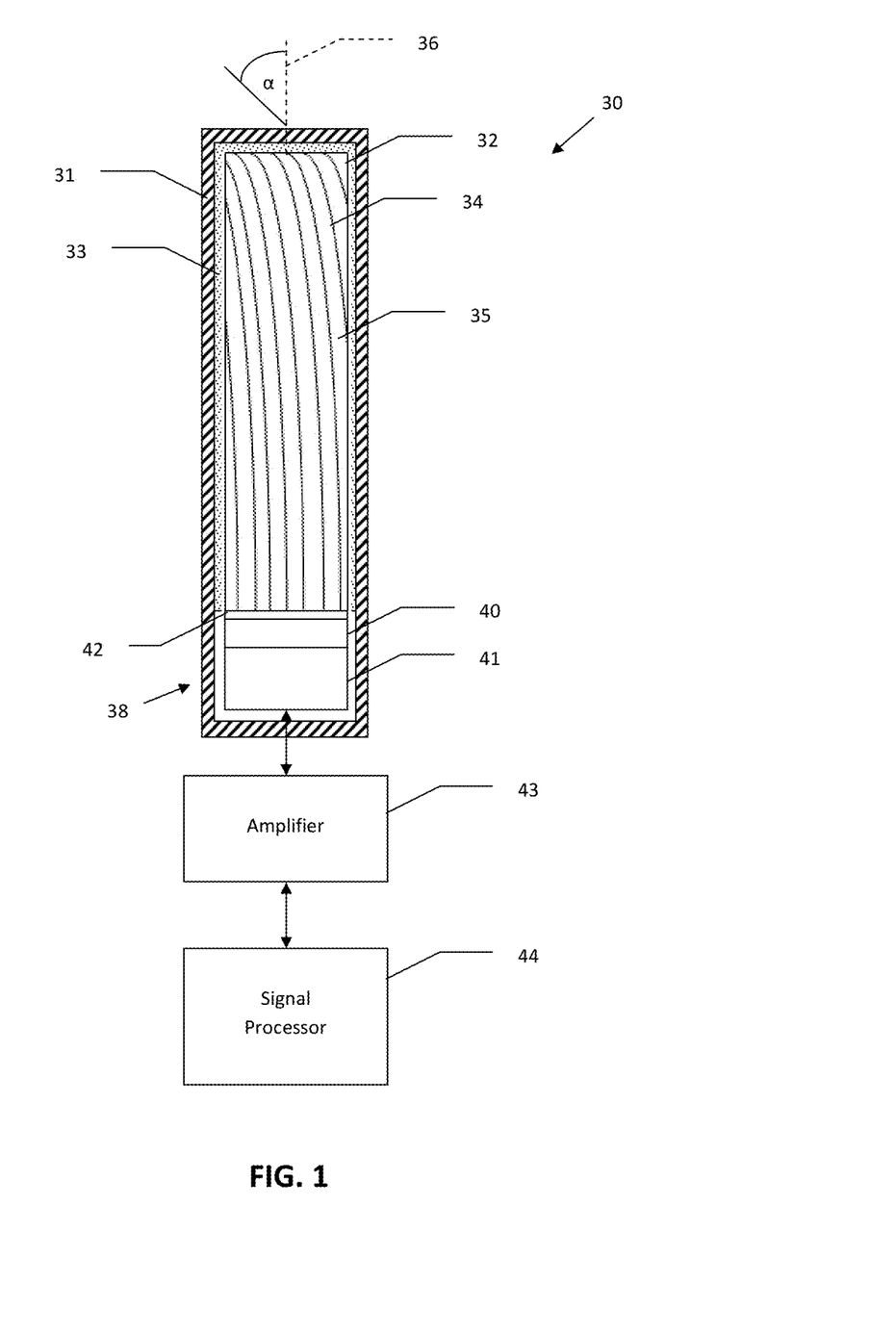
FIG. 1 is a schematic block diagram of a radiation detector in accordance with an example embodiment including a scintillator body with scratches spiraling around an exterior surface thereof.

Referring initially to FIG. 1, a radiation detector 30 is first described. The radiation detector 30 includes a detector housing 31, which in the illustrated example is cylindrical, such as for use in a well-logging tool, as will be described further below. The detector housing 31 may comprise a metal (e.g., aluminum, etc.) which allows gamma rays to pass through. A scintillator body 32 (which is also cylindrical in the illustrated example) is carried within the detector housing 31. The radiation detector 30 further illustratively includes a photodetector 38 coupled to the scintillator body 32 and also carried within the detector housing 31. In the illustrated example, the photodetector 38 includes a photomultiplier window 40 coupled to the scintillator body 32 via an optional optical coupler 42 (e.g., a silicon pad, etc.), and a photocathode 41 deposited on the photomultiplier window. It should be noted that other suitable photodetector configurations may be used in different embodiments, such as an avalanche photodiode (APD) configuration, for example.

Figure 6:
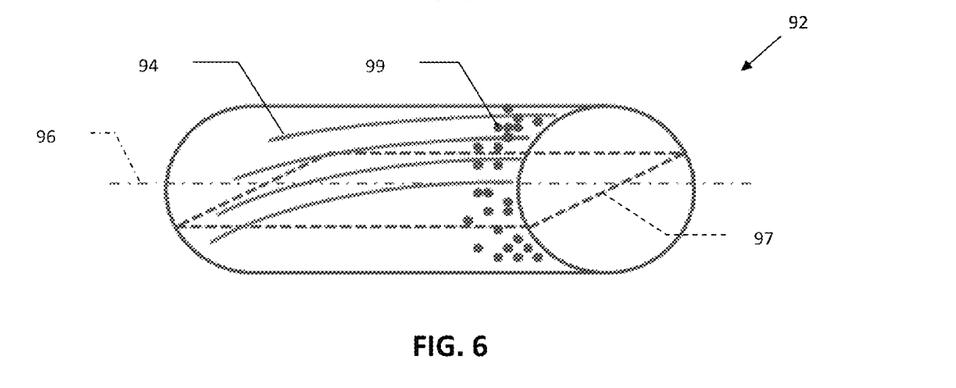
Figure 9:
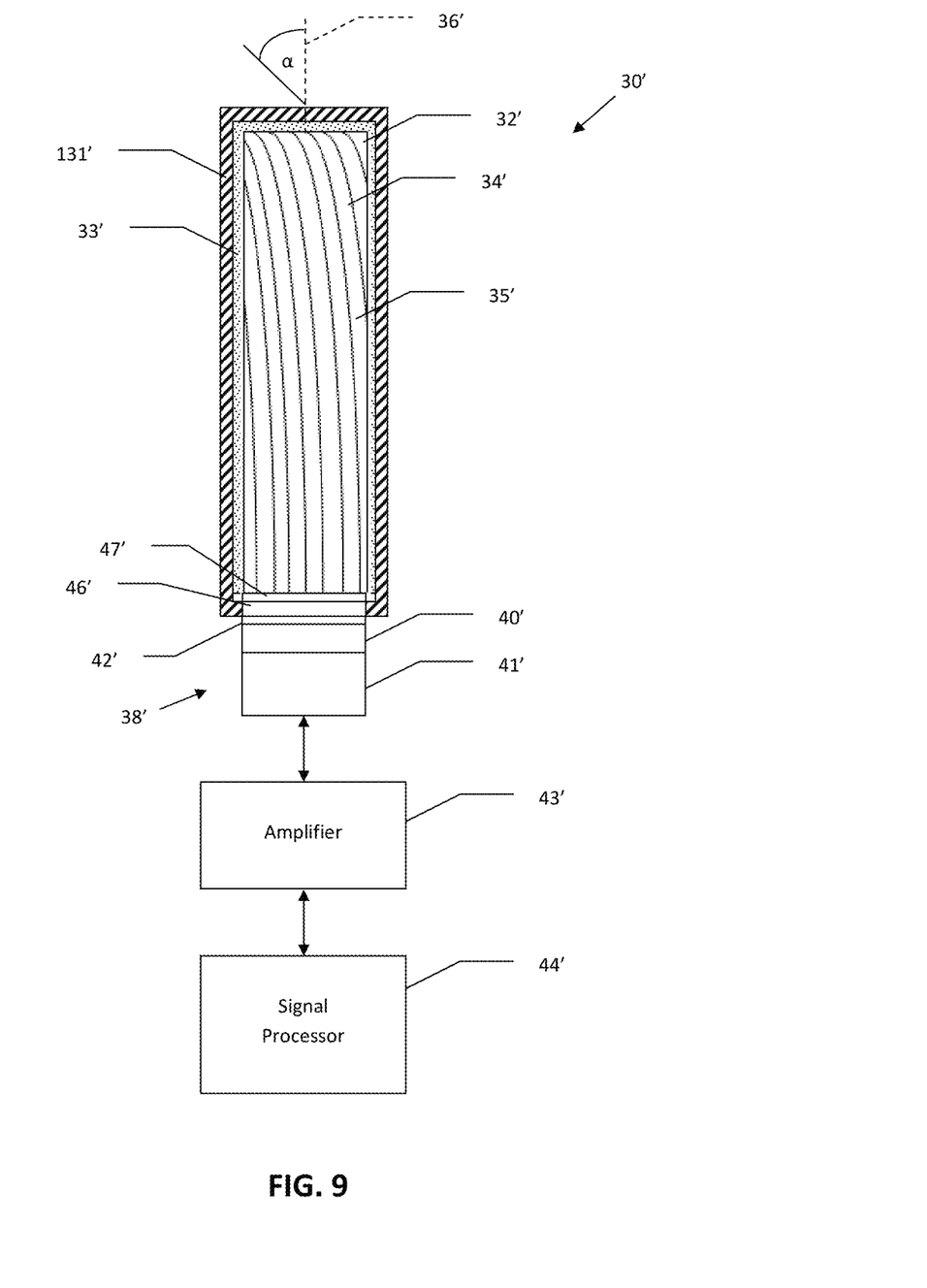
FIG. 9 is a schematic block diagram of another embodiment of the radiation detector of FIG. 1.

In another embodiment shown in FIG. 6, a packaged (hygroscopic) scintillator may be used in which the scintillator body 32' is positioned within its own scintillator housing 131'. The scintillator housing 131' has an exit window 46' to which the photodetector 38' is coupled (e.g., by an optical coupling pad 47'). The scintillator housing 131' and the photodetector 38' may be contained inside the detector housing (not shown in FIG. 9), and this configuration provides additional protection for the scintillator body 32' from the ambient atmosphere, and in particular from moisture, as will be appreciated by those skilled in the art.

In the case of gamma-rays passing through the detector housing 31 and interacting with the scintillator body 32, energy deposited by the gamma-rays is converted into light, which in turn may be received by the photodetector 38. The photodetector 38 converts the light from the scintillator body 32 into an electrical signal. The electrical signal may be amplified by an amplifier(s) 43, which may provide an amplified signal to a signal processor or processing circuitry 44. The signal processor 44 may include a general or special-purpose processor, such as a microprocessor or field programmable gate array, and associated memory, and may perform a spectroscopic analysis of the electrical signal, for example.

A reflector material 33 may optionally surround the scintillator body 32 to improve the light transport via the photomultiplier window 40. That is, the scintillator body 32 may be "reflectorized" with optical reflectors such as powders or sheets/strips of reflective material. The exterior surface of the scintillator body 32 may also be reflectorized after compensation by bonding of a reflector material onto it. For example, aluminum or silver coatings may be deposited on the exterior surface of the scintillator body 32 directly, or with an intermediate transparent layer such as magnesium fluoride (MgF$_2$). It should be noted that in FIG. 1, the detector housing 31 and reflector material 33 are shown in cross-section, but the scintillator body 32 is not.

Various types of scintillator materials may be used for the scintillator body 32 depending upon the given application. Example scintillator materials may include: gadolinium oxyorthosilicate (GSO), YAlO$_3$ (YAP), LuYAP, LaCl$_3$(Ce) (lanthanum chloride doped with Cerium), LaBr$_3$(Ce) (Cerium-doped lanthanum bromide), bismuth germanate (BGO), NaI (Tl), LuAG, YAG, LuAP, SrI$_2$, GAGG/GYGaGG, CeBr$_3$, GdI$_2$, LuI$_2$, ceramic scintillators, GPS, LPS, BaBrI, LuAG ceramic, LiCaF, CLYC, CLLB, CLLC, etc. It should be noted that while the embodiments herein are described with reference to gamma-ray detection, the various configurations and method aspects discussed herein may also be used for other types of radiation detectors as well.

As noted above, scintillating crystals are widely used in radiation detectors in several research and industrial fields, including the oil industry. The scintillating crystal emits light when struck by ionizing radiation. In a radiation detector configuration, the scintillation light is to be directed towards the photodetector 38, whose function is to convert the light signal into an electrical signal for processing by the signal processor 44. To optimize the light collection by the light sensing device, the crystal surface may not be kept smooth. More particularly, the crystal surface may be modified, such as by scratching with abrasives in the same direction as defined by the alignment of the crystal and the light sensing device (i.e., along the crystal axis or other suitable direction), a process referred to as optical compensation.

Scintillating crystals may be subjected to mechanical stress when packaged into a detector, especially for use in harsh environments such as wellbore applications. For example, the crystal may be packaged under axial and/or radial compression to prevent movement resulting from shocks and vibrations. The crystal may also be subjected to mechanical stress from shock propagation and thermal stress when ramping up or down in temperature. As a result of such stresses, optical compensation with scratches as described above may coincide with the weakest mechanical direction in the crystal, and/or a potentially mechanically weak area where the sidewall meets the end face. The above-described optical compensation may accordingly create defects reaching the crystal edges where mechanical stress from packaging may occur, resulting in a higher probability of fracturing the crystal during operation in harsh environments.

More particularly, when the crystal is subjected to excessive stress, a fracture may be initiated. The point of initiation is located where the level of local stress is greater than the strength of the crystal in that location. The compensation scratches at the surface of the crystal are points where cracks are more likely to start. Additionally, some crystals are anisotropic, meaning that their physical properties are different in different directions. A consequence of anisotropy is that the mechanical properties of the crystal may be very different in different directions and present cleavage planes where the structural weakness is greatest. When cleavage planes are oriented along the same direction as the one to be used for optical compensation (in the case of a cylindrical crystal, along the crystal axis), the result is that the weakness generated by the compensation scratch at the surface of the crystal compounds the weakness along the cleavage plane, creating a very weak mechanical area where fractures are most likely to start. Other weak mechanical areas are crystal edges where external stress from compression or shocks may be applied.

To help reduce the potential for defects and fracturing, while still providing desired optical compensation, the scintillator body 32 illustratively includes a plurality of surface scratches 34 which spiral or curve around the exterior surface of the scintillator body to define corresponding surface ridges or protrusions 35 therebetween (which also spiral around the exterior surface). By way of example, the compensation direction of spiraling may be slightly offset at an angle $\alpha$ relative to a crystal axis 36 (and/or cleavage plane(s)) of the scintillator body 32. By way of example, a desired reduction of defects and/or fracturing may occur with the angle $\alpha$ being greater than five degrees. Generally speaking, the greater the angle, the greater the reduction in defects and/or fractures, but the lower the radiation collection will be, so the angle may be chosen differently in different embodiments depending upon the various stress and collection efficiency constraints of a given application.

With respect to a depth of the surface scratches 34, the depth may be selected based upon the type of scintillator material being used. For example, for materials that are more prone to fracture and where stress needs to be reduced, the scratch depth may be relatively small, such as up to about 10 microns. For materials that are less prone to fracture, the scratch depth may be increased, e.g., up to about 200 microns. Furthermore, various entry angles may also be used for the surface scratches 34. The scratch entry angle will in part depend on the abrasive used. Generally speaking, sharper entry angles may provide improved optical results, and the sharper angles may be obtained with sharper abrasives (e.g., diamond-based abrasives). Considering the distribution of facet angles on the crystal surface, it may generally be desired to increase the probability of facets above 30 degrees, such as to around 60 degrees. However, it should be noted that the depth and entry angle of the scratches should not necessarily be considered as absolute numbers but rather distributions, and other values besides the example values given above may also be used in some embodiments.

The angular offset of the surface scratches 34 helps reduce the places where surface compensation defects, crystal structural weaknesses and direction of outside applied stress coincide. With scintillator materials such as GSO Gadolinium oxyorthosilicate (monoclinic) and LaBr$_3$ (hexagonal), for example, a cleavage plane may be located along the crystal axis. In these cases, creating compensation scratches along the crystal but with a slight rotation angle $\alpha$ helps avoid creating scratches coinciding with a cleavage plane, and increases the mechanical strength of the compensated crystal. The surface scratches 34 may accordingly intersect the cleavage plane, but will not run along the plane. Moreover, during thermal changes, contraction or expansion of the scintillator body 32 may create tensile stress at the surface along the crystal axis 36. Since the spiral surface scratches 34 do not run along the crystal axis 36, this also helps reduce the chances of fracture initiation from thermal changes.

The surface scratches 32 may be formed using diamond abrasives between 10 and 40 microns in size which are applied to the exterior surface of the scintillator body 32 while it is rotated about the axis 36, for example, although other types and sizes of abrasive particles may also be used. Moreover, the abrasive may also be rotated around the scintillator body 32. By way of reference, the scintillator body 32 may have a diameter of about one to two inches, and a length of about three to five inches in an example wellbore logging tool detector configuration, but different sizes may be used in different embodiments. The surface scratches 34 change the path of the light (photons) traveling inside of the scintillator body 32 to control the statistics of the length of their path, which is directly related to their probability of being either absorbed or detected. The surface scratches 34 may accordingly provide a more uniform and enhanced probability of photon detection, which results in enhanced detector performance.

Figure 2:
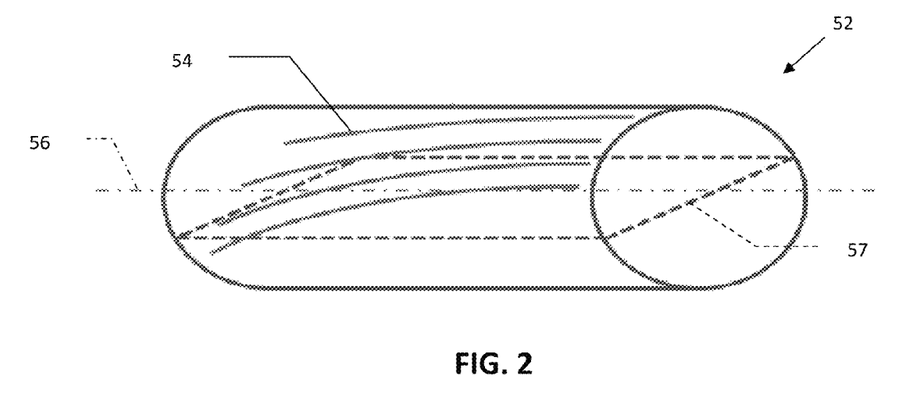
FIGS. 2-6 are perspective views illustrating other embodiments of scintillator bodies which may be used in the radiation detector of FIG. 1.

In the example of FIG. 1, the scratches 34 extend all the way to both ends (i.e., edges) of the scintillator body 32. However, referring to another embodiment of a scintillator body 52 shown in FIG. 2, some or all of the spiral scratches 54 may stop short of, or terminate before, the edges of the scintillator body. This may help further reduce the creation of defects adjacent the ends of the scintillator body 32, although the greater the gap between the edges and the scratches 54, the lower the collection will be as a result of the reduction in roughened exterior surface area. A crystal axis 56 and cleavage plane 57 are also shown in FIG. 2. By reducing the overlap between the optical compensation and the directions and/or areas of weakest mechanical strength, the probability of fracturing the scintillator body 52 during operation in harsh environments is further reduced. That is, ending the surface scratches 54 before they reach the edges of the scintillator body 52 also helps avoid adding a mechanical defect to a structurally weak part of the crystal, which further increases resilience to stress, especially when the crystal is subjected to axial mechanical loading. By way of example, the surface scratches 54 may be terminated at least 1 mm before (i.e., away from) the edges of the scintillator body 52.

Figure 3:
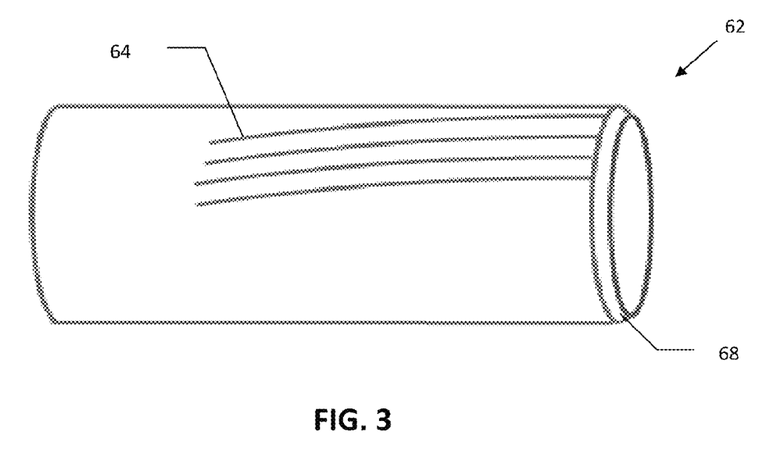

Still another approach to help alleviate defects adjacent the edges is provided by a scintillator body 62 shown in FIG. 3. Here, a small taper or chamfer 68 is provided on one or both of the edges of the scintillator body 62 so that the spiral scratches 64 do not extend to the ends of the scintillator body. That is, the taper 68 breaks off the 90° angle between the sidewall and the end surface, which may be a mechanically weak point where fractures may be initiated more easily. Yet, the taper 68 may be made relatively small to help avoid excessive trapping of light within the scintillator body 62 so that it can escape into the photodetector 38.

Figure 4:
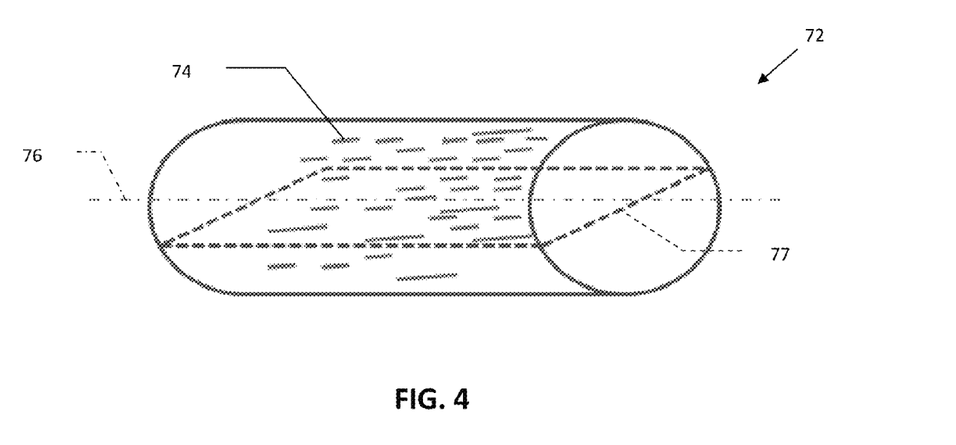

Still another embodiment is shown in FIG. 4, in which a scintillator body 72 has a crystal axis 76 and cleavage plane 77. Here, the spiral surface scratches 34 are shortened or abbreviated, but are still angularly offset with respect to the crystal axis 76.

Figure 5:
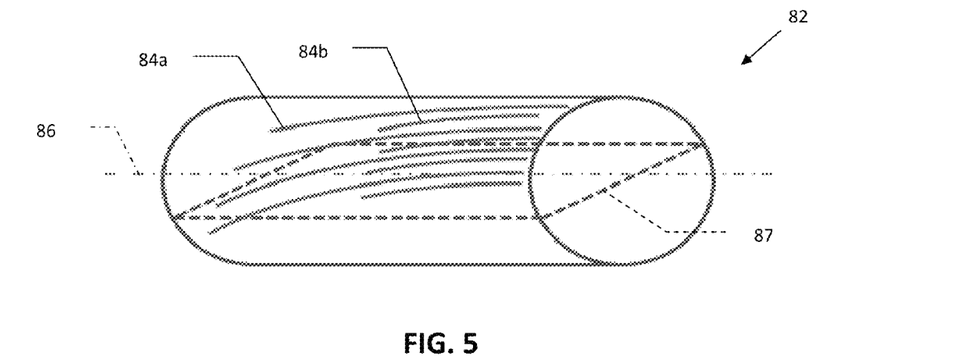

Yet another embodiment is shown in FIG. 5, in which a scintillator body 82 has a crystal axis 86 and cleavage plane 87. Here, a plurality of different spiral surface scratches 84a, 84b have respective different scratch densities. For example, a first scratching operation may be performed with a first abrasive size and/or application pressure, and then a second scratching operation may be performed with a different abrasive size and/or a different application pressure. A single scratching operation with a mix of abrasives of different sizes may also be performed to achieve this configuration. This may advantageously help customize the optical compensation for different applications, if desired.

In still another embodiment shown in FIG. 6, a scintillator body 92 has a crystal axis 96 and cleavage plane 97. An additional surface roughening operation has been applied which is isotropic, such as sandblasting or chemical etching, for example, to provide isotropic roughness spots 99. Here again, this may be used to help customize the optical compensation for the given application. It should be noted that, while the above described embodiments and techniques are shown separately for clarity, various steps and features may be combined in different embodiments.

Figure 7:
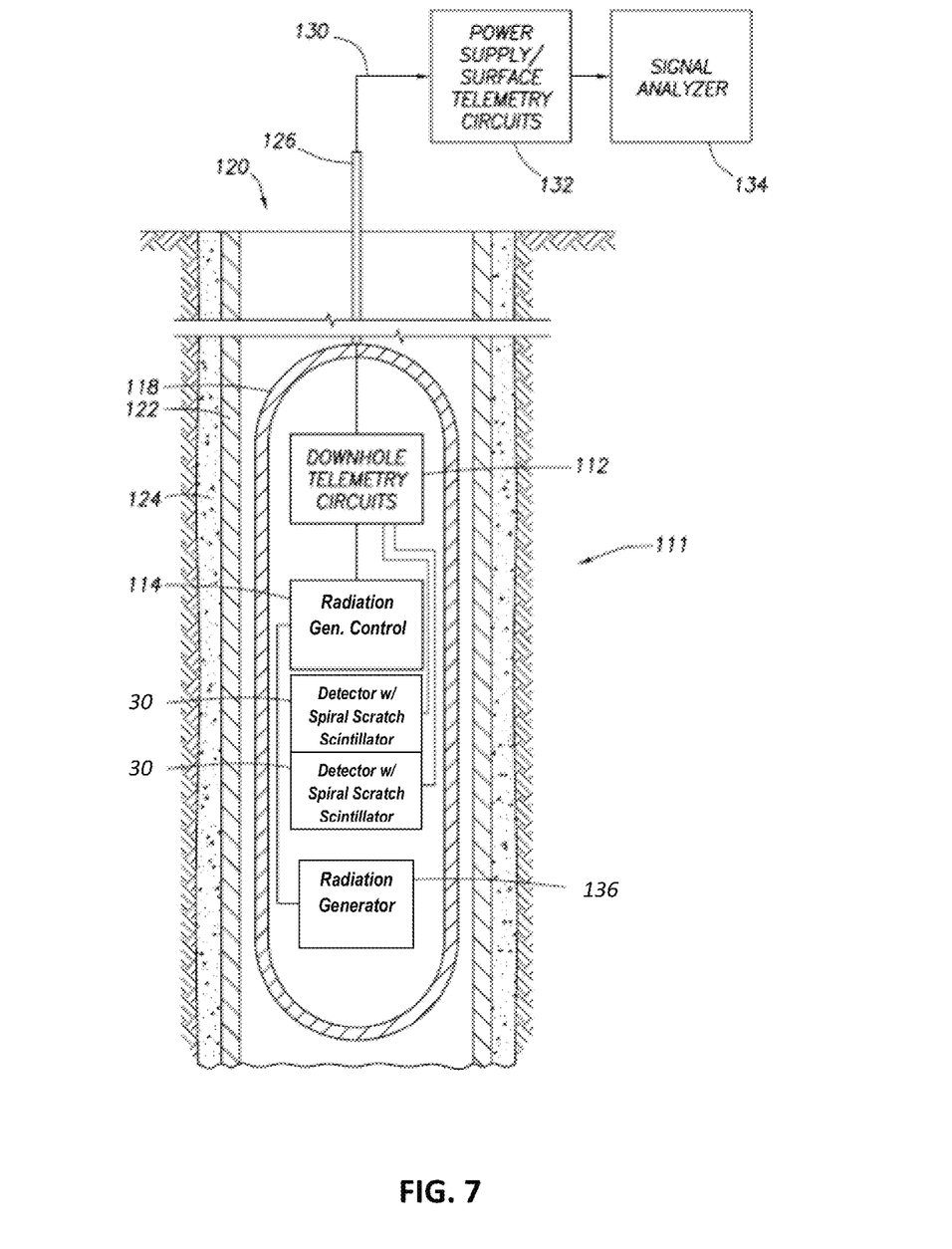
FIG. 7 is a schematic block diagram of a well-logging tool in which the radiation detector of FIG. 1 may be used.

Turning now to FIG. 7, an example embodiment of a well-logging tool in which one or more detectors 30 (similar to those described above) may be used. The detectors 30 are positioned within a sonde housing 118 along with a radiation generator 136 (e.g., neutron generator, etc.) and associated high voltage electrical components (e.g., power supply). Supporting control circuitry 114 for the radiation generator 136 (e.g., low voltage control components) and other components, such as downhole telemetry circuitry 112, may also be carried in the sonde housing 118.

The sonde housing 118 is to be moved through a borehole 120. In the illustrated example, the borehole 120 is lined with a steel casing 122 and a surrounding cement annulus 124, although the sonde housing and radiation generator 136 may be used with other borehole configurations (e.g., open holes). By way of example, the sonde housing 118 may be suspended in the borehole 120 by a cable 126, although a coiled tubing, etc., may also be used. Furthermore, other modes of conveyance of the sonde housing 118 within the borehole 120 may be used, such as wireline, slickline, Tough Logging Conditions (TLC) systems, and logging while drilling (LWD), for example. The sonde housing 118 may also be deployed for extended or permanent monitoring in some applications.

A multi-conductor power supply cable 130 may be carried by the cable 126 to provide electrical power from the surface (from power supply circuitry 132) downhole to the sonde housing 118 and the electrical components therein (i.e., the downhole telemetry circuitry 112, low-voltage radiation generator support circuitry 114, and one or more of the above-described radiation detectors 30). However, in other configurations power may be supplied by batteries and/or a downhole power generator, for example.

The radiation generator 136 is operated to emit neutrons to irradiate the geological formation adjacent the sonde housing 118. gamma-rays that return from the formation are detected by the radiation detectors 30. The outputs of the radiation detectors 30 are communicated to the surface via the downhole telemetry circuitry 112 and the surface telemetry circuitry 132 and may be analyzed by a signal analyzer 134 to obtain information regarding the geological formation. By way of example, the signal analyzer 134 may be implemented by a computer system executing signal analysis software for obtaining information regarding the formation. More particularly, oil, gas, water and other elements of the geological formation have distinctive radiation signatures that permit identification of these elements. Signal analysis can also be carried out downhole within the sonde housing 118 in some embodiments.

Figure 8:
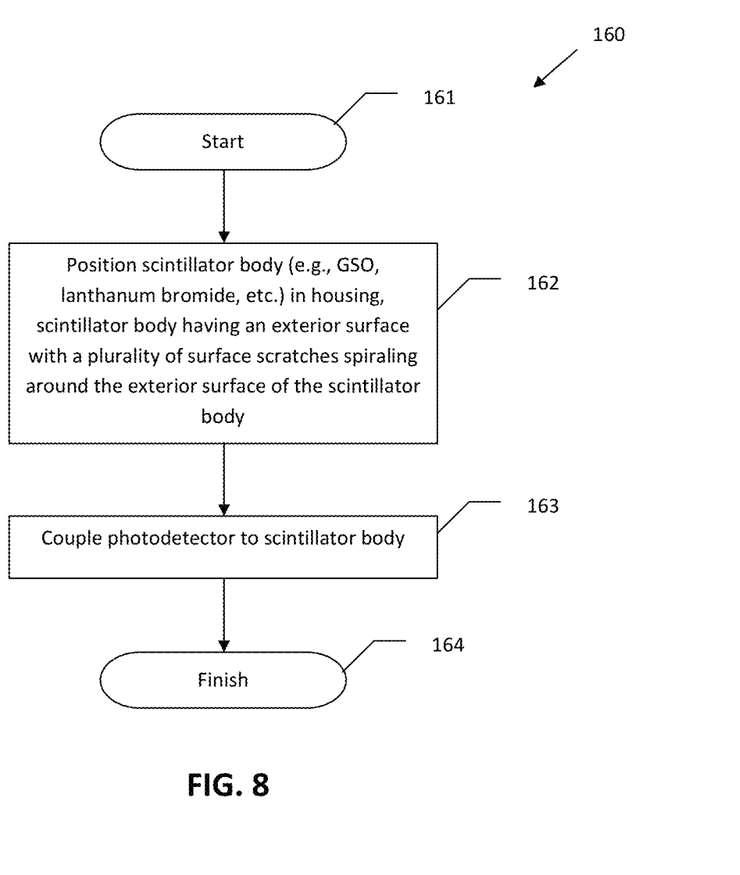
FIG. 8 is a flow diagram illustrating method aspects associated with making the radiation detector of FIG. 1.

A related method for making the radiation detector 30 is now described with reference to the flow diagram 160 of FIG. 8. Beginning at Block 161, the method illustratively includes positioning the scintillator body 32 in the housing 31 once the spiral surface scratches 34 have been formed on the exterior surface, at Block 162. The method further illustratively includes coupling the photodetector 38 to the scintillator body 32, at Block 163, which concludes the method illustrated in FIG. 8 (Block 164).

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A radiation detector comprising:
   a housing;
   a scintillator body carried by said housing and comprising a scintillator crystal having a crystal axis, said scintillator body having an exterior surface with a plurality of surface scratches spiraling around the exterior surface at an angular offset of at least five degrees relative to the crystal axis; and
   a photodetector coupled to said scintillator body.

2. The radiation detector of claim 1 wherein said scintillator body has opposing first and second ends; and wherein at least one of the first and second ends is tapered.

3. The radiation detector of claim 1 wherein the surface scratches have a plurality of different scratch densities.

4. The radiation detector of claim 1 wherein said scintillator body further has a plurality of isotopic roughness spots on the exterior surface.

5. The radiation detector of claim 1 wherein said scintillator body has opposing first and second ends; and wherein at least some of the surface scratches terminate prior to the first end or the second end.

6. The radiation detector of claim 1 wherein said scintillator body has opposing first and second ends; and wherein at least some of the surface scratches extend to the first end or the second end.

7. The radiation detector of claim 1 wherein said scintillator body comprises at least one of gadolinium oxyorthosilicate (GSO), YAlO$_3$ (YAP), LuAP, cerium-doped lanthanum chloride, cerium-doped lanthanum bromide, bismuth germinate (BGO), and NaI(Tl), LuAG, and YAG.

8. The radiation detector of claim 1 wherein said scintillator body is cylindrical.

9. The radiation detector of claim 1 further comprising a light reflecting material on portions of the exterior surface.

10. The radiation detector of claim 1 wherein said photodetector comprises:
    a photomultiplier window coupled to the distal end of said scintillator body; and
    a cathode coupled to said photomultiplier window.

11. The radiation detector of claim 1 further comprising:
    an amplifier coupled to said photodetector; and
    a signal processor coupled with said photodetector to detect an electrical signal from said photodetector.

12. A well-logging tool comprising:
    a sonde housing;
    at least one radiation detector carried by said sonde housing and comprising
      a housing,
    a scintillator body carried by said housing and comprising a scintillator crystal having a crystal axis, said scintillator body having an exterior surface with a plurality of surface scratches spiraling around the exterior surface at an angular offset of at least five degrees relative to the crystal axis, and
    a photodetector coupled to said scintillator body.

13. The well-logging tool of claim 12 further comprising a radiation generator carried by said sonde housing.

14. The well-logging tool of claim 12 wherein said scintillator body has opposing first and second ends; and wherein at least one of the first and second ends is tapered.

15. The well-logging tool of claim 12 wherein the surface scratches have a plurality of different scratch densities.

16. A scintillator comprising:
    a body having an exterior surface and comprising a scintillator crystal having a crystal axis; and
    a plurality of spaced-apart ridges on the exterior surface defined by a plurality of surface scratches spiraling around the exterior surface at an angular offset of at least five degrees relative to the crystal axis.

17. The scintillator body of claim 16 wherein the surface scratches have a plurality of different scratch densities.

18. A method for making a radiation detector comprising:
    positioning a scintillator body in a housing, the scintillator body comprising a scintillator crystal having a crystal axis having an exterior surface with a plurality of surface scratches spiraling around the exterior surface of the scintillator body at an angular offset of at least five degrees relative to the crystal axis; and
    coupling a photodetector to the scintillator body.

19. The method of claim 18 wherein the scintillator body has opposing first and second ends; and wherein at least one of the first and second ends is tapered.

20. The method of claim 18 wherein the surface scratches have a plurality of different scratch densities.

21. The method of claim 18 wherein the scintillator body further has a plurality of isotopic roughness spots on the exterior surface.

* * * * *